Patented Jan. 11, 1949

2,458,551

UNITED STATES PATENT OFFICE 2,458,551

PREPARATION OF CARBON
TETRAFLUORIDE

Anthony Francis Benning, Woodstown, N. J., Joseph Dal Park, Boulder, Colo., and Stanley Earl Krahler, Wilmington, Del., assignors to E. I. du Pont de Nemours & Company, Wilmington, Del., a corporation of Delaware No Drawing. Application February 18, 1947, Serial No. 729,420

10 Claims. (Cl. 260—653)

This invention relates to a process for making carbon tetrafluoride, particularly by the fluorination of chloromethanes.

Carbon tetrafluoride is a very stable compound which is useful as a low temperature refrigerant, as a dielectric and for other purposes. However, it has not been employed commercially because no method has been known for making it economically on a commercial scale. Carbon tetrafluoride has been prepared by reacting various forms of elementary carbon with fluorine and with $UF_6$. It has also been obtained by treating $CCl_4$, $CHCl_3$ and $CH_4$ with fluorine and by reacting $CCl_4$ with AgF at 300° C. Such methods of preparation are unsuited for commercial production because of their high cost, the corrosive properties of fluorine and poor yields. More recently, Leicester, in U. S. Patent 2,110,369, has indicated that carbon tetrafluoride may be formed when $CCl_4$ is passed, together with HF, over $CrF_3$ at temperatures up to 550° C. with the principal products being $CCl_3F$ and $CCl_2F_2$. Leicester indicates that temperatures of 600° C. and above cannot be used, because of the pyrolytic decomposition of $CCl_4$ at temperatures above 550° C. with the formation of hexachlorethane. Accordingly, the process of Leicester appears to be impractical for the production of carbon tetrafluoride on a commercial scale because of the low yields.

It is an object of our invention to produce carbon tetrafluoride in high yields by a process which is economical and commercially practicable. Another object is to provide a process for producing high yields of carbon tertafluoride by the fluorination of carbon tetrahalides in which at least one halogen atom is chlorine and the rest of the halogen atoms are fluorine. Other objects are to advance the art. Still other objects will appear hereinafter.

The above and other objects may be accomplished in accordance with our invention which comprises reacting a carbon tetrahalide, in which at least one halogen atom is chlorine and the rest of the halogen atoms are fluorine, in the vapor phase with at least a stoichiometric amount of anhydrous hydrogen fluoride in the presence of a catalyst of the group of $CrF_3$ and $FeF_3$ at temperatures of from 700° C. to about 1000° C. for about 8 seconds or more. We have found that, under such conditions, the carbon tetrahalides are efficiently fluorinated to produce high yields of carbon tetrafluoride. This was surprising in view of the teaching in the art that the carbon tetrahalides decompose to form other products at these temperatures.

The process is generally carried out by mixing anhydrous hydrogen fluoride with vapor of the carbon tetrahalide and passing the mixture over and into contact with the catalyst contained in a suitable reaction tube wherein the catalyst is heated to and maintained at the desired temperature and then passing the off-gases through scrubbers wherein they are washed with water, after which they are passed over soda-lime and anhydrous calcium chloride and then either fractionally condensed or condensed together and then fractionally distilled. Any unfluorinated and insufficiently fluorinated products will usually be recycled.

The reaction tube may be made of any suitable material lined with carbon, inconel, or a noble metal, such as gold or platinum, or any other material which will withstand the action of the hot hydrogen fluoride and hydrogen chloride. Instead of having the tube made of a baser material and lined with the inert material, the tube may, of course, be constructed wholly of the inert material.

Any carbon tetrahalide, in which at least one halogen atom is chlorine and the rest of the halogen atoms are fluorine, or a mixture of any two or more thereof may be employed as the starting material. Such carbon tetrahalides are $CCl_4$, $CCl_3F$, $CCl_2F_2$ and $CClF_3$.

The catalysts $CrF_3$ and $FeF_3$ may be employed in unmounted form, but will more conveniently be employed on a suitable inert mount or carrier, such as carbon and $CaF_2$, which will withstand the high temperatures employed and will resist the action of hydrogen fluoride and hydrogen chloride. In preparing the mounted catalyst, we may employ preformed $CrF_3$ of $FeF_3$ or the catalyst may be formed in situ by treating the mount with a solution of a chromium or iron salt of a volatile acid such as the chloride, bromide, nitrate, acetate and the like and then treating with anhydrous hydrogen fluoride at high temperatures.

We have found that a temperature of about 700° C. is critical in this process. Temperatures substantially below 700° C. produce only insignificant amounts of carbon tetrafluoride. This is shown in the following Tables I and II which give the results obtained by passing representative chlorofluoromethanes in the vapor phase admixed with anhydrous HF over $CrF_3$ at various temperatures. The data of Table I were obtained in a carbon lined Inconel tube with a thermocouple in contact with the wall of the tube and those in Table II were obtained in an unlined Inconel tube with the thermocouple in the center of the catalyst bed.

Table I

| Organic used | Calc. Contact Time | Wall Temp., °C | Mol Ratio HF/Organic | Conversion $CF_4$ |
|---|---|---|---|---|
| | Seconds | | | Per cent |
| $CF_2Cl_2$ | 26 | 555 | 1.6 | 0.1 |
| $CF_2Cl_2$ | 12 | 674 | 3.9 | 0.4 |
| $CF_3Cl$ | 11 | 879 | 3.1 | 84.4 |

Table II

| Organic Used | Calc. Contact Time | Catalyst Temp., °C. | Mol Ratio HF/Organic | Conversion $CF_4$ |
|---|---|---|---|---|
| | Seconds | | | Per cent |
| $CF_2Cl_2$ | 8 | 700 | 2.7 | 38 |
| $CF_3Cl$ | 10 | 775 | 1.8 to 2.0 | 89 |

The upper temperature is limited solely by the volatility of the catalyst and the ability of the equipment to withstand the temperatures employed. For practical reasons, the upper temperature will be about 1000° C. It will usually be preferred to employ temperatures from about 760° C. to about 950° C. with optimum yields being obtained in the range of from about 800° C. to about 950° C.

The amount of anhydrous hydrogen fluoride employed will correspond to at least stoichiometric amounts, that is, for each mol of carbon tetrachloride, there will be employed at least 4 mols of HF and for $CClF_3$, there will be employed at least one mol of HF. The anhydrous hydrogen fluoride may be employed in any amount in excess of the stoichiometric amount. Usually, we prefer to employ from about 10% to about 300% excess over the stoichiometric amount of HF. Larger excesses are not detrimental but are without advantage.

The time of contact of the vapors with the catalyst mass may be from about 8 seconds to any longer period that may be desired. The carbon tetrafluoride is stable under the conditions employed and hence there is no upper limit on the contact time. We preferably employ contact times of from about 10 to about 20 seconds. There is no advantage in employing larger contact times as the reaction is substantially complete within 20 seconds.

We preferably carry out the process at substantially atmospheric pressures. Higher and lower pressures may be employed. However, high pressures will usually be undesirable because of the difficulty of control due to the fact that the reaction is exothermic.

In order to more clearly illustrate our invention, the preferred modes of carrying the same into effect and the advantageous results to be obtained thereby, the following examples are given:

*Example 1*

A chromium fluoride catalyst, containing 10% by weight of $CrF_3$, was prepared by mixing a slurry of 70 parts of $CrF_3.3H_2O$ and 310 parts of absolute ethanol with 420 parts of 4 to 8 mesh activated carbon and removing the alcohol from the catalyst by heating at 220–230° C. for two hours under 3 mm. Hg pressure. Over this catalyst, placed in a carbon-lined Inconel tube and heated to 880° C. (shell temp.), was passed a mixture of anhydrous HF and $CF_3Cl$ (at atmospheric pressure), in the molar ratio of 3.1:1, at a contact time of approximately 11 to 12 seconds. The off-gases were washed with water at 25° C., passed through soda-lime and anhydrous calcium chloride, and finally condensed at liquid $N_2$ temperature. On analysis, the condensate had the following composition:

|  | Per cent by weight |
|---|---|
| $CF_4$ | 88.5 |
| $CF_3Cl$ | 11.5 |

By recycling the $CF_3Cl$, a $CF_4$ yield approaching 100% is obtained.

This experiment was repeated using an unlined Inconel tube. Probably because of better heat transfer, 93 to 98% conversions to $CF_4$ were obtained.

*Example 2*

A chromium fluoride catalyst was prepared by mixing a solution of 79 parts of $CrCl_3.6H_2O$ and 200 parts of absolute alcohol with 420 parts of activated carbon and heating the mixture to 540° C. In an atmosphere of HF to remove the alcohol and water and to convert the $CrCl_3$ to $CrF_3$. The process of Example 1 was repeated using a reactor temperature of 880° C. and an $HF/CF_3Cl$ ratio 2.6:1 (contact time of 13.1 seconds). The off-gases had the following composition:

|  | Per cent by weight |
|---|---|
| $CF_4$ | 85 |
| $CF_3Cl$ | 15 |

The only known loss is mechanical and the yield of $CF_4$ is essentially quantitative if the $CF_3Cl$ is recycled.

*Example 3*

A mixture of anhydrous HF and $CCl_2F_2$ vapor in the ratio 3.5:1 was passed over a chromium fluoride catalyst, prepared as in Example 1, and maintained at 900° C. (reactor temperature), the time of contact with the catalyst being about 16 to 17 seconds. The gases, collected as in Example 1, had the following composition:

|  | Per cent by weight |
|---|---|
| $CF_4$ | 96.6 |
| $CF_3Cl$ | 3.4 |

*Example 4*

A mixture of anhydrous HF and $CCl_4$ vapor in the ratio of 4.8:1 was passed over a chromium fluoride catalyst, prepared as in Example 1 and maintained at 760° C. (reactor temperature), in an unlined Inconel tube. The time of contact with the catalyst was 13.6 seconds. The gases were collected as in Example 1 and had the following composition:

|  | Percent by weight |
|---|---|
| $CF_4$ | 71.5 |
| $CF_3Cl$ | 28.5 |

By recycling the CF$_3$Cl, an 89% yield of CF$_4$ is obtainable.

Example 5

A ferric fluoride catalyst was prepared by impregnating 600 parts of activated carbon with a solution of 67 parts of anhydrous FeCl$_3$ in 200 parts of absolute ethanol, removing the alcohol under 3 mm. Hg pressure at 240° C. for 2 hours, and heating the FeCl$_3$-carbon catalyst for 3 hours at 280° C. in an atmosphere of HF. The process of Example 4 was repeated using a reactor temperature of 760° C. and an HF/CCl$_4$ ratio of 5.2:1 (contact time of 14.4 seconds). The off-gases had the following composition:

| | Percent by weight |
|---|---|
| CF$_4$ | 60 |
| CF$_3$Cl | 40 |

It will be understood that the examples above given are presented solely for illustrative purposes and that our invention is not to be limited to the specific embodiments therein. It will be apparent to those skilled in the art that many variations and modifications can be made in the process as hereinbefore defined without departing from the spirit or scope of our invention. For example, mixtures of the carbon tetrahalides may be employed. Also, the catalyst may be unmounted. For instance, a suitable catalyst was made by pelletizing CrF$_3$.3H$_2$O with 2% of its weight of pulverized polymeric tetrafluoroethylene and then heating to 850° C. in the presence of anhydrous HF to drive off the water of crystallization and the polymerized tetrafluoroethylene. The resulting pellets of CrF$_3$ were somewhat more active than the carbon mounted chromium fluoride catalyst disclosed in the examples, converting 95% of CClF$_3$ to CF$_4$ at 871° C. compared with a corresponding conversion with the carbon mounted catalyst at 935° C. Accordingly, we intend to cover our invention broadly as in the appended claims.

It will be apparent that, by our invention, we have provided a process whereby high yields of carbon tetrafluoride can be readily obtained by the fluorination of carbon tetrahalides. The process is simple and economical to operate and constitutes a practical method for producing carbon tetrafluoride on a commercial scale.

We claim:

1. The process of preparing carbon tetrafluoride which comprises reacting a carbon tetrahalide, in which at least one halogen atom is chlorine and the rest of the halogen atoms are fluorine, in the vapor phase with at least a stoichiometric amount of anhydrous hydrogen fluoride in the presence of a catalyst of the group consisting of CrF$_3$ and FeF$_3$ at temperatures of from 700° C. to about 1000° C. for at least 8 seconds, and separating the carbon tetrafluoride.

2. The process of preparing carbon tetrafluoride which comprises reacting a carbon tetrahalide, in which at least one halogen atom is chlorine and the rest of the halogen atoms are fluorine, in the vapor phase with at least a stoichiometric amount of anhydrous hydrogen fluoride in the presence of a catalyst of the group consisting of CrF$_3$ and FeF$_3$ at temperatures of from about 760° C. to about 950° C. for at least 8 seconds, and separating the carbon tetrafluoride.

3. The process of preparing carbon tetrafluoride which comprises reacting a carbon tetrahalide, in which at least one halogen atom is chlorine and the rest of the halogen atoms are fluorine, in the vapor phase with at least a stoichiometric amount of anhydrous hydrogen fluoride in the presence of a catalyst of the group consisting of CrF$_3$ and FeF$_3$ at temperatures of from 700° C. to about 1000° C. for from about 10 to about 20 seconds, and separating the carbon tetrafluoride.

4. The process of preparing carbon tetrafluoride which comprises reacting a carbon tetrahalide, in which at least one halogen atom is chlorine and the rest of the halogen atoms are fluorine, in the vapor phase with at least a stoichiometric amount of anhydrous hydrogen fluoride in the presence of a catalyst of the group consisting of CrF$_3$ and FeF$_3$ at temperatures of from about 760° C. to about 950° C. for from about 10 to about 20 seconds, and separating the carbon tetrafluoride.

5. The process of preparing carbon tetrafluoride which comprises reacting a carbon tetrahalide, in which at least one halogen atom is chlorine and the rest of the halogen atoms are fluorine, in the vapor phase with from about 10% to about 300% excess over a stoichiometric amount of anhydrous hydrogen fluoride in the presence of a catalyst of the group consisting of CrF$_3$ and FeF$_3$ at temperatures of from 700° C. to about 1000° C. for at least 8 seconds, and separating the carbon tetrafluoride.

6. The process of preparing carbon tetrafluoride which comprises reacting a carbon tetrahalide, in which at least one halogen atom is chlorine and the rest of the halogen atoms are fluorine, in the vapor phase with at least stoichiometric amount of anhydrous hydrogen fluoride in the presence of CrF$_3$ at temperatures of from 700° C. to about 1000° C. for at least 8 seconds, and separating the carbon tetrafluoride.

7. The process of preparing carbon tetrafluoride which comprises reacting a carbon tetrahalide, in which at least one halogen atom is chlorine and the rest of the halogen atoms are fluorine, in the vapor phase with at least a stoichiometric amount of anhydrous hydrogen fluoride in the presence of CrF$_3$ at temperatures of from about 760° C. to about 950° C. for at least 8 seconds, and separating the carbon tetrafluoride.

8. The process of preparing carbon tetrafluoride which comprises reacting a carbon tetrahalide, in which at least one halogen atom is chlorine and the rest of the halogen atoms are fluorine, in the vapor phase with at least a stoichiometric amount of anhydrous hydrogen fluoride in the presence of CrF$_3$ at temperatures of from 700° C. to about 1000° C. for from about 10 to about 20 seconds, and separating the carbon tetrafluoride.

9. The process of preparing carbon tetrafluoride which comprises reacting a carbon tetrahalide, in which at least one halogen atom is chlorine and the rest of the halogen atoms are fluorine, in the vapor phase with at least a stoichiometric amount of anhydrous hydrogen fluoride in the presence of CrF$_3$ at temperatures of from about 760° to about 950° C. for from about 10 to about 20 seconds, and separating the carbon tetrafluoride.

10. The process of preparing carbon tetrafluoride which comprises reacting a carbon tetrahalide, in which at least one halogen atom is chlorine and the rest of the halogen atoms are fluorine, in the vapor phase with at least a stoichiometric amount of anhydrous hydrogen fluoride in the presence of CrF$_3$ at temperatures of from